United States Patent
Lopitaux et al.

(10) Patent No.: US 9,132,699 B2
(45) Date of Patent: Sep. 15, 2015

(54) RUBBER COMPOSITION FOR A TREAD COMPRISING AN UNSATURATED TPS

(75) Inventors: Garance Lopitaux, Valignat (FR); Didier Vasseur, Clermont-Ferrand (FR)

(73) Assignees: COMPAGNIE GENERAL DES ETABLISSEMENTS MICHELIN, Clermont-Ferrand (FR); MICHELIN RECHERCHE ET TECHNIQUE, Granges-Paccot (CH)

( * ) Notice: Subject to any disclaimer, the term of this patent is extended or adjusted under 35 U.S.C. 154(b) by 565 days.

(21) Appl. No.: 13/256,147

(22) PCT Filed: Mar. 12, 2010

(86) PCT No.: PCT/EP2010/053189
§ 371 (c)(1),
(2), (4) Date: Nov. 23, 2011

(87) PCT Pub. No.: WO2010/105984
PCT Pub. Date: Sep. 23, 2010

(65) Prior Publication Data
US 2012/0065292 A1  Mar. 15, 2012

(30) Foreign Application Priority Data
Mar. 16, 2009  (FR) ..................... 09 51627

(51) Int. Cl.
| | | |
|---|---|---|
| C08L 9/00 | (2006.01) |
| C08L 21/00 | (2006.01) |
| C08K 3/04 | (2006.01) |
| B60C 1/00 | (2006.01) |
| C08L 9/06 | (2006.01) |
| C08K 3/00 | (2006.01) |
| C08K 5/01 | (2006.01) |
| C08L 47/00 | (2006.01) |
| C08L 53/02 | (2006.01) |

(52) U.S. Cl.
CPC ................. B60C 1/0016 (2013.04); C08L 9/00 (2013.01); C08L 9/06 (2013.01); *C08K 3/0033* (2013.01); *C08K 5/01* (2013.01); *C08L 47/00* (2013.01); *C08L 53/02* (2013.01)

(58) Field of Classification Search
CPC .............. C08L 9/00; C08L 21/00; C08K 3/04
USPC ................................................. 524/495, 445
See application file for complete search history.

(56) References Cited

U.S. PATENT DOCUMENTS

| | | |
|---|---|---|
| 4,396,743 A | 8/1983 | Fujimaki et al. |
| 5,756,589 A | 5/1998 | Sandstrom et al. |
| 5,977,238 A | 11/1999 | Labauze |
| 6,013,718 A | 1/2000 | Cabioch et al. |
| 6,503,973 B2 | 1/2003 | Robert et al. |
| 6,774,255 B1 | 8/2004 | Tardivat et al. |
| 6,815,473 B2 | 11/2004 | Robert et al. |
| 2003/0125446 A1* | 7/2003 | Wang et al. .................. 524/495 |
| 2004/0051210 A1 | 3/2004 | Tardivat et al. |
| 2004/0132880 A1 | 7/2004 | Durel et al. |
| 2005/0016650 A1 | 1/2005 | Durel et al. |
| 2005/0016651 A1 | 1/2005 | Durel et al. |
| 2006/0089445 A1 | 4/2006 | Gandon-Pain |
| 2007/0225427 A1* | 9/2007 | Wright et al. ................. 524/505 |
| 2008/0009564 A1* | 1/2008 | Robert et al. ................. 523/351 |
| 2008/0188621 A1 | 8/2008 | Ichino et al. |
| 2010/0227968 A1* | 9/2010 | Joseph et al. ................. 524/526 |

FOREIGN PATENT DOCUMENTS

| | | |
|---|---|---|
| CN | 1946790 A | 4/2007 |
| EP | 0 180 716 A1 | 5/1986 |
| EP | 0 470 693 A2 | 2/1992 |
| EP | 0 831 121 A1 | 3/1998 |
| EP | 1 757 658 A1 | 2/2007 |
| FR | 2916449 * | 5/2007 |
| WO | WO 97/36724 A2 | 10/1997 |
| WO | WO 99/16600 | 4/1999 |
| WO | WO 02/30939 A1 | 4/2002 |
| WO | WO 02/31041 A1 | 4/2002 |
| WO | WO 02/083782 A1 | 10/2002 |
| WO | WO 02/088238 A1 | 11/2002 |
| WO | WO 03/002648 A1 | 1/2003 |
| WO | WO 03/002649 A1 | 1/2003 |
| WO | WO 03/016837 A1 | 2/2003 |
| WO | WO 2005/087859 A1 | 9/2005 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2008/003434 A1 | 1/2008 |
| WO | WO 2008/003435 A1 | 1/2008 |
| WO | WO 2008/145314 * | 12/2008 |
| WO | WO 2009/044790 * | 4/2009 |

OTHER PUBLICATIONS

International Search Report mailed Jun. 30, 2010 for International Application No. PCT/EP2010/053189.
Office Action Search Report Patent Application No. 201080012171.6 dated Apr. 27, 2015.

\* cited by examiner

*Primary Examiner* — James J Seidleck
*Assistant Examiner* — Deve E Valdez
(74) *Attorney, Agent, or Firm* — Dickinson Wright PLLC

(57) ABSTRACT

The present invention relates to a rubber composition comprising a styrene-butadiene copolymer (SBR), a polybutadiene (BR), an unsaturated thermoplastic styrene (TPS) copolymer and a reinforcing filler.
The invention also relates to the use of such a composition for the manufacture of a tire tread that has improved properties in terms of wear resistance, while retaining a very good level of grip on wet ground.

25 Claims, No Drawings

RUBBER COMPOSITION FOR A TREAD COMPRISING AN UNSATURATED TPS

The present invention relates to rubber compositions intended, in particular, for the manufacture of tyres or of semi-finished products for tyres; it relates more particularly to rubber compositions that can be used in the treads of these tyres.

As is known, a tyre tread has to meet a large number of often conflicting technical requirements, including a low rolling resistance, a high wear resistance and a high grip on both the dry road and the wet road.

This compromise in properties, in particular from the viewpoint of the rolling resistance and the wear resistance, was able to be improved in recent years with regard to energy-saving "Green Tyres", intended in particular for passenger vehicles, by virtue in particular of the use of novel low hysteresis rubber compositions having the feature of being reinforced predominantly by specific inorganic fillers, described as reinforcing fillers, in particular by highly dispersible silicas (HDSs), capable of rivaling, from the viewpoint of the reinforcing power, conventional tyre-grade carbon blacks.

Enhancing the wear resistance properties of tyre treads remains, however, a constant concern of tyre designers.

It is especially known to use unsaturated thermoplastic styrene (TPS) copolymers in tyre treads to improve some of the usage properties thereof, in particular the performances of grip on wet ground, rolling resistance and abrasion resistance, as described, for example, in documents U.S. Pat. No. 5,756,589, EP 0 180 716 A1 or EP 0 470 693 A1.

Following their research, the Applicants have discovered a specific rubber composition, based on a styrene-butadiene copolymer, a polybutadiene, an unsaturated TPS copolymer and a reinforcing filler, which makes it possible to obtain tyre treads having a further improved wear resistance, while retaining an excellent level of grip on wet ground.

Thus, a first subject of the invention relates to a rubber composition comprising a styrene-butadiene copolymer (SBR), a polybutadiene (BR), an unsaturated thermoplastic styrene (TPS) copolymer and a reinforcing filler.

Another subject of the invention is the use of this rubber composition for the manufacture of tyres or of semi-finished products for tyres, in particular tyre treads, whether the latter are intended for the manufacture of new tyres or for the retreading of worn tyres.

Another subject of the invention is a tread comprising a rubber composition according to the invention.

Another subject of the invention is the tyres themselves, when they comprise a rubber composition in accordance with the invention.

The tyres of the invention are particularly intended to be fitted on motor vehicles of the passenger type, SUV ("Sport Utility Vehicles") type, two-wheel vehicles (especially motorcycles) and aircraft, such as industrial vehicles chosen from vans, heavy vehicles, i.e. underground trains, buses, road transport vehicles (lorries, towing vehicles, trailers), off-road vehicles such as agricultural or civil-engineering vehicles, and other transport or handling vehicles.

The invention and its advantages will be readily understood in light of the description and the exemplary embodiments that follow.

I—MEASUREMENTS AND TESTS USED

The rubber compositions after curing and the tyres are characterized, as indicated below.

I.1—Tensile Tests

These tests make it possible to determine the elasticity stresses and the properties at break. Unless otherwise indicated, they are carried out in accordance with the French standard NF T 46-002 of September 1988. At second elongation (i.e. after an accommodation cycle at the extension rate provided for the measurement itself) the tensile strengths (in MPa, denoted by CR) and the elongations at break (in %, denoted by AR) are measured. All these tensile measurements are carried out under standard temperature (23±2° C.) and moisture (50±5% relative humidity) conditions, according to the French standard NF T 40-101 (December 1979).

I.2—Shore A Hardness

The Shore A hardness of the compositions after curing is assessed in accordance with the standard ASTM D 2240-86.

I.3—Dynamic Properties

The dynamic properties are measured on a viscosity analyser (Metravib VA4000) according to the standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded during a temperature sweep at a fixed stress of 0.7 MPa. The value of tan ($\delta$) observed at 40° C. (i.e. tan ($\delta$)$_{40°\ C.}$) is recorded.

It is recalled, in a manner well known to a person skilled in the art, that the value of tan ($\delta$)$_{40°\ C.}$ is representative of the hysteresis of the material, and therefore of the rolling resistance: the lower tan ($\delta$)$_{40°\ C.}$, the lower the rolling resistance.

I.4—Tyre Tests

Wear Resistance

The tyres are subjected to actual on-road running on a specific motor vehicle until the wear due to the running reaches the wear indicators positioned in the grooves of the tread. A value greater than that of the control, arbitrarily set at 100, indicates an improved result, that is to say a greater mileage traveled.

Grip on Wet Ground

In order to assess the grip performance on wet ground, the behaviour of tyres fitted to a given motor vehicle travelling, under maximum speed conditions, around a very winding circuit that is sprayed in order to keep the ground wet, is analysed. The minimum time needed to travel the whole of the circuit is measured; a value greater than that of the control, arbitrarily set at 100, indicates an improved result, that is to say a shorter travel time.

II—CONDITIONS FOR IMPLEMENTING THE INVENTION

The rubber composition according to the invention comprises a styrene-butadiene copolymer (abbreviated to "SBR"), a polybutadiene (abbreviated to "BR"), an unsaturated thermoplastic styrene copolymer (abbreviated to "TPS") and a reinforcing filler.

In the present description, unless expressly indicated otherwise, all the percentages (%) shown are % by weight. Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

II.1—Diene Elastomers

It is recalled here that the term "diene" elastomer or rubber should be understood to mean, in a known manner, an elastomer resulting at least in part (i.e., a homopolymer or a copolymer) from diene monomers (monomers bearing two carbon-carbon double bonds which may or may not be conjugated).

The rubber composition according to the invention has the first essential feature of comprising, as first diene elastomer, a styrene-butadiene copolymer (SBR).

The SBR copolymers may, for example, be block, random, sequential or microsequential copolymers and may be prepared in dispersion or in solution; they may be coupled and/or star-branched or else functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or else of polyether groups (such as described, for example, in U.S. Pat. No. 6,503,973).

The SBR elastomer may be an SBR prepared in emulsion ("ESBR") or an SBR prepared in solution ("SSBR"). In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a $T_g$ of between −10° C. and −55° C.

The rubber composition comprises an SBR content preferably between 20 and 90 phr, more preferably between 30 and 85 phr and more preferably still between 50 and 80 phr (phr signifying parts by weight per hundred parts of total elastomer, therefore including the unsaturated TPS copolymer).

A second essential feature of the composition according to the invention is of comprising, as second diene elastomer, a polybutadiene (BR).

Especially suitable are polybutadienes having a content (mol %) of 1,2-units of between 4% and 80% or those having a content (mol %) of cis-1,4-units of greater than 80%, more preferably greater than 90%, in particular greater than 95%.

The rubber composition preferably comprises a BR content of between 5 and 60 phr, more preferably in a range from 10 to 50 phr.

II.2—Unsaturated Thermoplastic Styrene Elastomer

The rubber composition according to the invention has another essential feature of comprising a thermoplastic styrene copolymer (abbreviated to "TPS").

It will be recalled, first of all, that thermoplastic styrene elastomers (also known as "TPS" elastomers) are thermoplastic elastomers which are in the form of styrene-based block copolymers. Having a structure intermediate between thermoplastic polymers and elastomers, they are composed, in a known manner, of hard polystyrene blocks linked by soft elastomer blocks, for example polybutadiene, polyisoprene or poly(ethylene/butylene) blocks. They are often triblock elastomers with two hard segments linked by a soft segment. The hard and soft segments may be in a linear, star or branched configuration. These TPS elastomers may also be diblock elastomers with one single hard segment linked to a soft segment. Typically, each of these segments or blocks contains at least more than 5, generally more than 10 base units (for example styrene units and isoprene units for a styrene/isoprene/styrene block copolymer).

It will also be recalled that the expression "unsaturated TPS copolymer" should be understood to mean a TPS copolymer that is provided with ethylenically unsaturated groups, that is to say which comprises (conjugated or unconjugated) carbon-carbon double bonds. The expression "saturated TPS copolymer" should be understood to mean a TPS copolymer that does not comprise any ethylenically unsaturated groups (i.e. no carbon-carbon double bond).

According to one preferred embodiment, the unsaturated copolymer is a copolymer comprising at least one (i.e. one or more) styrene block (i.e. polystyrene block) and at least one (i.e. one or more) diene block (i.e. polydiene), this polydiene block being in particular a polyisoprene or polybutadiene block.

According to one particular embodiment, the TPS is a diblock copolymer comprising a polydiene block, especially polybutadiene or polyisoprene block, and a polystyrene block; more preferably, it is chosen from the group formed by styrene/butadiene (SB) and styrene/isoprene (SI) block copolymers and blends of these copolymers.

According to another particular embodiment, the TPS is a copolymer comprising at least 3 blocks, that is to say at least one (i.e. one or more) polydiene block, especially polybutadiene or polyisoprene block, positioned between two polystyrene blocks; more preferably, it is chosen from the group formed by styrene/butadiene/styrene (SBS), styrene/isoprene/styrene (SIS) and styrene/butadiene/isoprene/styrene (SBIS) copolymers and blends of these copolymers.

More preferably, this unsaturated TPS elastomer is chosen from the group formed by styrene/butadiene (SB), styrene/isoprene (SI), styrene/butadiene/isoprene (SBI), styrene/butadiene/styrene (SBS), styrene/isoprene/styrene (SIS) and styrene/butadiene/isoprene/styrene (SBIS) block copolymers and blends of these copolymers.

According to one more particular embodiment, said thermoplastic elastomer is chosen from the group formed by SBS copolymers, SIS copolymers, SI copolymers and blends of these copolymers.

According to another preferred embodiment of the invention, the content of styrene in the TPS elastomer is between 5% and 50%. Below the minimum indicated, the thermoplastic nature of the elastomer runs the risk of being substantially reduced, whereas above the recommended maximum the elasticity of the composition may be adversely affected. For these reasons, the styrene content is more preferably between 10% and 40%, in particular between 15% and 35%.

The number-average molecular weight (denoted by $M_n$) of the TPS elastomer is preferably between 50 000 and 500 000 g/mol, more preferably between 75 000 and 450 000 g/mol, especially for use of the composition in a tyre tread. The number-average molecular weight ($M_n$) of the TPS elastomer is determined in a known manner by size exclusion chromatography (SEC). The specimen is first dissolved in tetrahydrofuran with a concentration of about 1 g/l; then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series having the trade names STYRAGEL (HMW7, HMW6E and two HT6E) is used. The injected volume of the polymer specimen solution is 100 μl. The detector is a WATERS 2410 differential refractometer and its associated software for handling the chromatographic data is the WATERS MILLENNIUM system. The calculated average molecular weights are relative to a calibration curve obtained with polystyrene standards.

The rubber composition preferably comprises between 5 and 50 phr of unsaturated TPS copolymer, preferably between 10 and 40 phr, for example within a range from 15 to 30 phr.

According to one particularly preferred embodiment of the invention, the rubber composition comprises from 40 to 80 phr of SBR, from 10 to 30 phr of BR and from 10 to 30 phr of TPS.

Unsaturated TPS elastomers such as, for example, SBS or SIS, are well known and commercially available, for example from Kraton under the name "Kraton D" (e.g., products D1161, D1118, D1116, D1163 for examples of SIS and SBS elastomers) and from Dynasol under the name "Calprene" (e.g., products C405, C411, C412 for examples of SBS elastomers).

Dexco (Dow/Exxonmobil Venture) sells, for example, the following products:
Vector 8505: SBS copolymer;
Vector 4114: blend of SIS/SI copolymers.

II.3—Reinforcing Filler

Use may be made of any type of reinforcing filler known for its capabilities of reinforcing a rubber composition which can be used for the manufacture of tyres, for example an organic filler, such as carbon black, a reinforcing inorganic filler, such as silica, or else a blend of these two types of filler, in particular a blend of carbon black and silica.

All carbon blacks, in particular blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example, N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers as described in Applications WO-A-2006/069792, WO-A-2006/069793, WO-A-2008/003434 and WO-A-2008/003435.

The expression "reinforcing inorganic filler" should be understood, in the present patent application, by definition, to mean any inorganic or mineral filler (whatever its colour and its natural or synthetic origin), also known as "white filler", "clear filler" or even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the expression "reinforcing inorganic filler" is also understood to mean mixtures of various reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in Application WO 03/16837.

The reinforcing inorganic filler used, in particular if it is silica, preferably has a BET surface area of between 45 and 400 $m^2/g$, more preferably of between 60 and 300 $m^2/g$.

Preferably, the content of total reinforcing filler (carbon black and/or reinforcing inorganic filler, such as silica) is between 20 and 200 phr, more preferably between 30 and 150 phr, the optimum being, in a known manner, different depending on the particular applications targeted: the level of reinforcement expected with regard to a bicycle tyre, for example, is, of course, less than that required with regard to a tyre capable of running at high speed in a sustained manner, for example a motorcycle tyre, a tyre for a passenger vehicle or a tyre for a utility vehicle, such as a heavy vehicle.

According to a preferred embodiment of the invention, use is made of a reinforcing filler comprising between 50 and 120 phr of inorganic filler, particularly silica, and optionally carbon black; the carbon black, when it is present, is preferably used at a content of less than 20 phr, more preferably of less than 10 phr (for example between 0.1 and 10 phr).

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of polysulphide-containing silanes, referred to as "symmetrical" or "asymmetrical" depending on their particular structure, as described, for example, in Applications WO 03/002648 (or US 2005/016651) and WO 03/002649 (or US 2005/016650).

Particularly suitable, without the definition below being limiting, are "symmetrical" polysulphide-containing silanes corresponding to the following general formula (I):

in which:
x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, especially $C_1$-$C_4$, alkylenes, in particular propylene);
Z corresponds to one of the formulae below:

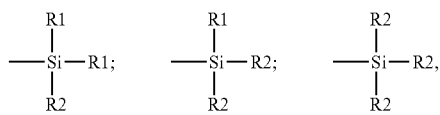

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl);

the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of polysulphide-containing alkoxysilanes corresponding to the above formula (I), in particular the usual mixtures available commercially, the mean value of the "x" index is a fractional number preferably between 2 and 5, more preferably in the vicinity of 4. However, the invention may also advantageously be carried out, for example, with disulphide-containing alkoxysilanes (x=2).

Mention will more particularly be made, as examples of polysulphide-containing silanes, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulphides (in particular disulphides, trisulphides or tetrasulphides), more particularly bis(monoethoxydimethylsilylpropyl) tetrasulphide, as described in Patent Application WO 02/083782 (or US 2004/132880).

Mention will in particular be made, as coupling agent other than polysulphide-containing alkoxysilane, of bifunctional POSs (polyorganosiloxanes) or else of hydroxysilane polysulphides ($R^2$=OH in the above formula I), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions in accordance with the invention, the content of coupling agent is preferably between 4 and 12 phr, more preferably between 4 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II.4—Various Additives

The rubber compositions in accordance with the invention also comprise all or some of the usual additives customarily used in the elastomer compositions especially intended for the manufacture of treads, such as, for example, pigments, protective agents, such as antiozone waxes, chemical antiozonants, antioxidants, plasticizing agents other than those mentioned above, antifatigue agents, reinforcing resins, methylene acceptors (for example, phenol-novolac resin) or methylene donors (for example, HMT or H3M), a crosslinking system based either on sulphur or on sulphur donors and/or on peroxide and/or on bismaleimides, vulcanization accelerators and vulcanization activators.

These compositions may also comprise, in addition to coupling agents, coupling activators, agents for covering the inorganic fillers or more generally processing aids capable, in a known manner, by virtue of an improvement in the dispersion of the filler in the rubber matrix and of a lowering in the viscosity of the compositions, of improving their ability to be processed in the uncured state, these agents being, for example, hydrolysable silanes, such as alkylalkoxysilanes, polyols, polyethers, primary, secondary or tertiary amines or hydroxylated or hydrolysable polyorganosiloxanes.

According to one preferred embodiment, the rubber compositions of the invention also comprise a plasticizing agent. Preferably, this plasticizing agent is a solid hydrocarbon-based resin, a liquid plasticizer or a mixture of the two.

The content of plasticizing agent is preferably between 5 and 50 phr, more preferably between 10 and 40 phr, for example between 15 and 35 phr.

According to one preferred embodiment of the invention, this plasticizing agent is a hydrocarbon-based resin, the $T_g$ of which is above 0° C., preferably above +20° C.

In a manner known to a person skilled in the art, the name "resin" is reserved in the present patent application, by definition, for a compound which is, on the one hand, solid at ambient temperature (23° C.) (in contrast to a liquid plasticizing compound, such as an oil) and, on the other hand, compatible (that is to say, miscible at the level used, typically of greater than 5 phr) with the rubber composition for which it is intended.

Preferably, the plasticizing hydrocarbon-based resin exhibits at least any one of the following characteristics:
 a $T_g$ of above 20° C., more preferably of above 30° C.;
 a number-average molecular weight ($M_n$) of between 400 and 2000 g/mol, more preferably of between 500 and 1500 g/mol;
 a polydispersity index ($I_p$) of less than 3, more preferably of less than 2 (reminder: $I_p=M_w/M_n$ with $M_w$ the weight-average molecular weight).

More preferably, this plasticizing hydrocarbon-based resin exhibits all of the preferred characteristics above.

The macrostructure ($M_w$, $M_p$ and $I_p$) of the hydrocarbon-based resin is determined by size exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

The hydrocarbon-based resins may be aliphatic or aromatic or else of aliphatic/aromatic type, that is to say based on aliphatic and/or aromatic monomers. They may be natural or synthetic and may or may not be petroleum-based (if such is the case, also known under the name of petroleum resins). They are preferably exclusively hydrocarbon-based, that is to say that they comprise only carbon and hydrogen atoms.

According to one particularly preferred embodiment, the hydrocarbon-based plasticizing resin is chosen from the group formed by cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

Mention will especially be made, among the above hydrocarbon-based plasticizing resins, of the resins of homopolymers or copolymers of α-pinene, β-pinene, dipentene or polylimonene, $C_5$ fraction, for example of $C_5$ fraction/styrene copolymer or $C_5$ fraction/$C_9$ fraction copolymer, which can be used alone or in combination with a liquid plasticizer, for example a plasticizing oil such as MES or TDAE.

According to another preferred embodiment of the invention, the plasticizer is a plasticizer that is liquid at 20° C., referred to as a "low $T_g$ plasticizer", i.e. which has, by definition, a $T_g$ of below −20° C., preferably of below −40° C.

Any extender oil, whether of aromatic or non-aromatic nature, any liquid plasticizing agent known for its plasticizing properties with regard to diene elastomers, can be used. Liquid plasticizers chosen from the group formed by naphthenic oils, particularly hydrogenated naphthenic oils, paraffinic oils, MES oils, TDAE oils, ester and ether plasticizers, phosphate and sulphonate plasticizers and the mixtures of these compounds are particularly suitable.

The compounds chosen from the group formed by phosphates, trimellitates, pyromellitates, phthalates, 1,2-cyclohexane dicarboxylates, adipates, azelates, sebacates, glycerol triesters, and mixtures of these compounds are particularly preferred.

According to one particularly preferred embodiment of the invention, use is made, as low $T_g$ liquid plasticizer, of a carboxylic acid diester corresponding to the formula (II):

R—O—OC—(CH$_2$)$_n$—CO—O—R in which n is included within a range from 1 to 15 and the R radicals, which are identical or different, represent any hydrocarbon-based radical (or chain) which has from 1 to 30 carbon atoms (and which may comprise a heteroatom chosen in particular from S, O and N).

Preferably, n is included within a range from 3 to 10 and the R radicals represent a linear, branched or cyclic alkyl group comprising from 4 to 15 carbon atoms. As examples of such preferred R radicals comprising from 4 to 15 carbon atoms, mention may be made, for example, of butoxyethyl, butoxyethoxyethyl, butyl, isobutyl, dibutyl, diisobutyl, benzylbutyl, heptyl, 2-ethylhexyl, benzyloctyl, dioctyl, diisooctyl, isononyl, isodecyl, diisodecyl, tridecyl and octyldecyl radicals. Use is particularly made of a diester of adipic acid (or adipate, n=4), of azelaic acid (or azelate, n=7) or of sebacic acid (or sebacate, n=8), very particularly a diester of adipic acid or adipate (n=4 in formula (II) above).

Use is more preferably made, among the above adipates of formula (II), of those corresponding to the formula (III):

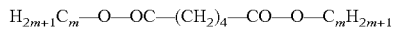

H$_{2m+1}$C$_m$—O—OC—(CH$_2$)$_4$—CO—O—C$_m$H$_{2m+1}$ in which m varies from 1 to 30, more preferably from 4 to 15, in particular from 7 to 13.

The preferred adipates of formula (III) are diisooctyl adipate (m=8), diisononyl adipate (m=9), diisodecyl adipate (m=10) and ditridecyl adipate (m=13). These adipates are commercially available. Mention may be made, by way of examples, of the plasticizers of the "Jayflex" series sold by Exxon Mobil, in particular the adipates "Jayflex DIOA" (m=8), "Jayflex DINA" (m=9), "Jayflex DIDA" (m=10) or "Jayflex DTDA" (m=13). Mention may be made, as other examples of these adipates of formula (III), of the plasticizers of the "Adimoll" series from Bayer, "Plasthall" series from CP Hall or else "Diplast" series from Lonza.

According to another preferred embodiment of the invention, use may be made, as liquid plasticizer, of a glycerol triester. The expression "glycerol triester" is also understood to mean a mixture of triesters. This triester is preferably composed predominantly (for more than 50% by weight, more preferably for more than 80% by weight) of an unsaturated C$_{18}$ fatty acid, that is to say a fatty acid chosen from the group formed by oleic acid, linoleic acid, linolenic acid and the mixtures of these acids. More preferably, whether it is of synthetic or natural origin (the case, for example, of sunflower or rapeseed plant oils) the fatty acid used is composed for more than 50% by weight, more preferably still for more than 80% by weight, of oleic acid. Such triesters (trioleates) comprising a high content of oleic acid are well known; for example they have been described in Application WO 02/088238, as plasticizing agents in treads for tyres.

II.5—Preparation of the Rubber Compositions

The compositions of the invention may be manufactured in appropriate mixers using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically below 110° C., for example between 40° C. and 100° C., finishing phase during which the crosslinking system is incorporated.

The process for preparing such compositions comprises, for example, the following stages:

incorporating into an SBR copolymer, during a first stage (referred to as a "non-productive" stage), a polybutadiene, an unsaturated TPS copolymer and a reinforcing filler, everything being kneaded thermomechanically (for example in one or more steps), until a maximum temperature of between 110° C. and 190° C. is reached;

cooling the combined mixture to a temperature below 100° C.;

subsequently incorporating, during a second stage (referred to as a "productive" stage), a crosslinking system;

kneading everything up to a maximum temperature below 110° C.

By way of example, the non-productive phase is carried out in a single thermomechanical stage during which, in a first step, all the necessary base constituents (SBR copolymer, polybutadiene, unsaturated TPS copolymer, reinforcing filler and coupling agent in the case of an inorganic filler) are introduced into an appropriate mixer, such as a standard internal mixer, followed, in a second step, for example after kneading for one to two minutes, by the other additives, optional additional filler-covering agents or processing aids, with the exception of the crosslinking system. The total kneading time, in this non-productive phase is preferably between 1 and 15 min.

After cooling the mixture thus obtained, the crosslinking system is then incorporated in an external mixer, such as an open mill, maintained at a low temperature (for example, between 40° C. and 100° C.). The combined mixture is then mixed (productive phase) for a few minutes, for example between 2 and 15 min.

The crosslinking system itself is preferably based on sulphur and on a primary vulcanization accelerator, in particular an accelerator of the sulphenamide type. Added to this vulcanization system, are various known secondary accelerators or vulcanization activators, such as zinc oxide, stearic acid, guanidine derivatives (in particular diphenylguanidine), etc., incorporated during the first non-productive phase and/or during the productive phase. The sulphur content is preferably between 0.5 and 3.0 phr and the primary accelerator content is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are more preferably chosen from the group formed by 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI"), zinc dibenzyldithiocarbamate (abbreviated to "ZBEC") and mixtures of these compounds. Preferably, a primary accelerator of the sulphenamide type is used.

The final composition thus obtained may then be calendered, for example in the form of a sheet or a slab, in particular for laboratory characterization, or else is extruded, for example to form a rubber profiled element used for manufacturing a tread.

The invention relates to the compositions, tyres and tyre treads described above, both in the uncured state (i.e., before curing) and in the cured state (i.e., after crosslinking or vulcanization).

III—EXEMPLARY EMBODIMENTS OF THE INVENTION

III.1—Preparation of the Compositions

The tests which follow are carried out in the following manner: the styrene-butadiene copolymer, the polybutadiene, the unsaturated TPS copolymer, the reinforcing filler (silica and carbon black), and also the various other ingredients, with the exception of the vulcanization system, are successively introduced into an internal mixer (final fill ratio: around 70% by volume), the initial vessel temperature of which is around 60° C. Thermomechanical working (non-productive phase) is then carried out in one stage, which lasts in total approximately 3 to 4 minutes, until a maximum "dropping" temperature of 165° C. is reached.

The mixture thus obtained is recovered and cooled and then sulphur and an accelerator of sulphenamide type are incorporated in a mixer (homofinisher) at 30° C., the combined mixture being mixed (productive phase) for an appropriate time (for example, between 5 and 12 min).

The compositions thus obtained are subsequently calendered, either in the form of slabs (thickness of 2 to 3 mm) or of fine sheets of rubber, for the measurement of their physical or mechanical properties, or extruded in the form of a tread.

III.2—Tyre Tests

This test demonstrates the improvement in terms of wear resistance of a tread comprising a composition in accordance with the invention, in comparison with a control tread.

In order to do this, two rubber compositions were prepared as indicated previously, one in accordance with the invention (denoted hereinbelow by C.2) and one not in accordance with the invention (control, denoted hereinbelow by C.1).

Composition C.1 is a reference composition for a person skilled in the art, which is conventionally used for manufacturing treads of "Green Tyres" for passenger vehicles, based on SBR and BR.

In composition C.2 according to the invention, in comparison with the control composition C.1, 20 phr of SBR were replaced with 20 phr of TPS copolymer (SBS).

Compositions C.1 and C.2 both comprise a plasticizing agent comprising, in combination, a hydrocarbon-based resin (polylimonene resin) and a liquid plasticizer (MES oil).

Their formulations (in phr or parts by weight per hundred parts of total elastomer, therefore including the unsaturated TPS copolymer), their rubber properties and the results of the tyre running tests have been summarized in the appended Tables 1, 2 and 3.

It is noted that the compositions C.1 and C.2 have the same stiffness levels (Shore A hardness), equivalent tensile strength values, composition C.2 according to the invention also exhibiting an improved elongation at break. The composition according to the invention exhibits dynamic properties of the same level, in particular a value of tan $(\delta)_{40° C.}$ which is substantially equal to that of the control composition C.1, synonymous with an equivalent hysteresis and therefore with an equivalent rolling resistance.

It should therefore be concluded therefrom that introducing an unsaturated TPS copolymer into the composition of the invention does not substantially modify its properties, apart from the elongation at break, relative to the control composition C.1.

These two compositions were tested as treads of passenger vehicle tyres, having dimensions 195/65R15, on a passenger vehicle of RENAULT make and LAGUNA model, as indicated in section 1.4 above.

On reading Table 3 (results in relative units, base 100 for the control tyre P.1), it is observed that the running of the tyres reveals a particularly marked improvement in the wear resistance of the tread of tyre P.2 comprising the composition C.2 according to the invention in comparison with the control C.1 (tyre P.1), while retaining the same excellent level of grip on wet ground.

In summary, the results of these tests demonstrate that the combined use of a styrene-butadiene copolymer, a polybutadiene and an unsaturated TPS copolymer makes it possible to significantly improve the compromise between wear resistance and grip on wet ground for tyre treads comprising a rubber composition according to the invention.

TABLE 1

| Composition No. | C. 1 | C. 2 |
| --- | --- | --- |
| SBR (1) | 85 | 65 |
| BR (2) | 15 | 15 |
| SBS (3) | — | 20 |
| Silica (4) | 85 | 85 |
| Carbon black (5) | 6 | 6 |
| Coupling agent (6) | 6.8 | 6.8 |
| Plasticizer (7) | 33 | 33 |
| Stearic acid (8) | 2.0 | 2.0 |
| ZnO (9) | 2.5 | 2.5 |
| Sulphur (10) | 1.1 | 1.1 |
| CBS (11) | 2.0 | 2.0 |
| DPG (12) | 1.5 | 1.5 |
| Antioxidant (13) | 1.9 | 1.9 |

(1) SBR solution (content expressed as dry SBR); 25% of styrene, 58% of 1,2-polybutadiene units and 22% of trans-1,4-polybutadiene units ($T_g$ = -21° C.);
(2) BR with 4.3% of 1,2 units; 2.7% of trans units; 93% of cis-1,4 units ($T_g$ = -106° C.);
(3) SBS: "Vector 8505" from Dexco;
(4) silica: "Zeosil 1165 MP" from Rhodia, of "HD" type - (BET and CTAB: around 160 m²/g);
(5) Carbon black: N234 (ASTM grade);
(6) TESTP coupling agent ("Si69" from Degussa);
(7) MES oil ("Catenex SNR" from Shell) + polylimonene resin ("Dercolyte L120 from DRT);
(8) stearine ("Pristerene" from Uniquema);
(9) zinc oxide (industrial grade - from Umicore);
(10) sulphur;
(11) N-cyclohexyl-2-benzothiazyl sulphenamide (Santocure CBS from Flexsys);
(12) DPG = Diphenylguanidine ("Perkacit DPG" from Flexsys);
(13) N-1,3-dimethylbutyl-N-phenyl-para-phenylenediamine (Santoflex 6-PPD from Flexsys).

TABLE 2

| Composition No. | C. 1 | C. 2 |
| --- | --- | --- |
| Shore A | 70 | 70 |
| Elongation at break | 469 | 569 |

TABLE 2-continued

| Composition No. | C. 1 | C. 2 |
|---|---|---|
| Tensile strength | 19 | 19.4 |
| $T_g(\delta)_{40°\ C.}$ | 0.25 | 0.26 |

TABLE 3

| Tyre No. | P. 1 | P. 2 |
|---|---|---|
| Grip on wet ground | 100 | 100 |
| Wear | 100 | 111 |

The invention claimed is:

1. A tire or semi-finished product for a tire comprising a rubber composition comprising:
   a styrene-butadiene (SBR) copolymer,
   a polybutadiene (BR),
   an unsaturated thermoplastic styrene (TPS) elastomer copolymer that comprises at least one polystyrene block and at least one polydiene block, and
   a reinforcing filler.

2. The tire or semi-finished product for a tire according to claim 1, wherein the SBR copolymer is present in an amount between 20 and 90 phr.

3. The tire or semi-finished product for a tire according to claim 2, wherein the SBR amount is between 30 and 85 phr.

4. The tire or semi-finished product for a tire according to claim 1, wherein the BR is present in an amount between 5 and 60 phr.

5. The tire or semi-finished product for a tire according to claim 4, wherein the BR amount is within a range from 10 to 50 phr.

6. The tire or semi-finished product for a tire according to claim 1, wherein the unsaturated TPS elastomer copolymer is present in an amount between 5 and 50 phr.

7. The tire or semi-finished product for a tire according to claim 6, wherein the amount of unsaturated TPS elastomer copolymer is between 10 and 40 phr.

8. The tire or semi-finished product for a tire according to claim 1, wherein the polydiene block is a polyisoprene or polybutadiene block.

9. The tire or semi-finished product for a tire according to claim 1, wherein the unsaturated TPS elastomer copolymer comprises a polydiene block and a polystyrene block.

10. The tire or semi-finished product for a tire according to claim 9, wherein the unsaturated TPS elastomer copolymer is a diblock copolymer.

11. The tire or semi-finished product for a tire according to claim 1, wherein the unsaturated TPS elastomer copolymer comprises at least 3 blocks, wherein the at least three blocks are arranged such that at least one polydiene block is positioned between two polystyrene blocks.

12. The tire or semi-finished product for a tire according to claim 11, wherein the unsaturated TPS elastomer copolymer is selected from the group consisting of styrene/butadiene/styrene (SBS), styrene/isoprene/styrene (SIS) and styrene/butadiene/isoprene/styrene (SBIS) block copolymers, and blends of these copolymers.

13. The tire or semi-finished product for a tire according to claim 1, further comprising a plasticizing agent.

14. The tire or semi-finished product for a tire according to claim 13, wherein the plasticizing agent is present in an amount between 5 and 50 phr.

15. The tire or semi-finished product for a tire according to claim 13, wherein the plasticizing agent is a hydrocarbon-based resin having a $T_g$ above 0° C.

16. The tire or semi-finished product for a tire according to claim 15, wherein the hydrocarbon-based resin is selected from the group consisting of cyclopentadiene or dicyclopentadiene homopolymer or copolymer resins, terpene homopolymer or copolymer resins, $C_5$ fraction homopolymer or copolymer resins, and the mixtures of these resins.

17. The tire or semi-finished product for a tire according to claim 13, wherein the plasticizing agent is a plasticizer that is liquid at 20° C., and that has a $T_g$ below −20° C.

18. The tire or semi-finished product for a tire according to claim 17, wherein the liquid plasticizer is selected from the group consisting of naphthenic oils, paraffinic oils, MES oils, TDAE oils, ester plasticizers, ether plasticizers, phosphate plasticizers, sulphonate plasticizers and mixtures of these compounds.

19. The tire or semi-finished product for a tire according to claim 13, wherein the plasticizer is a hydrocarbon-based resin having a $T_g$ above 0° C. and a plasticizer that is liquid at 20° C. and that has a $T_g$ below −20° C.

20. The tire or semi-finished product for a tire according to claim 1, wherein the reinforcing filler comprises carbon black, silica, or a mixture of carbon black and silica.

21. The tire or semi-finished product for a tire according to claim 1, wherein the reinforcing filler is present in an amount between 20 and 200 phr.

22. The tire or semi-finished product for a tire according to claim 1, wherein the rubber composition is in a tread of the tire.

23. A method of making a tire or a semi-finished product for a tire, comprising:
   thermomechanical kneading of the rubber composition of claim 1 at a temperature of between about 110° C. and about 190° C.; and
   mechanical working while incorporating a crosslinking system.

24. The method of claim 23, further comprising:
   cooling the rubber composition to a temperature below 110° C. between said thermomechanical kneading and said mechanical working.

25. The tire or semi-finished product for a tire according to claim 10, wherein the diblock copolymer is selected from the group consisting of styrene/butadiene (SB), styrene/isoprene (SI) block copolymers, and blends of these copolymers.

* * * * *